(12) United States Patent
Ishikawa et al.

(10) Patent No.: US 8,794,827 B2
(45) Date of Patent: Aug. 5, 2014

(54) THERMAL SENSING STRUCTURE AND INSULATING STRUCTURE OF THERMAL SENSING CIRCUIT

(75) Inventors: Satoshi Ishikawa, Makinohara (JP); Susumu Yamamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 623 days.

(21) Appl. No.: 12/654,401

(22) Filed: Dec. 18, 2009

(65) Prior Publication Data

US 2010/0195696 A1  Aug. 5, 2010

(30) Foreign Application Priority Data

Feb. 2, 2009  (JP) ................................. 2009-021120
Feb. 10, 2009  (JP) ................................. 2009-028412

(51) Int. Cl.
*G01K 5/00*  (2006.01)

(52) U.S. Cl.
USPC ............ 374/152; 374/166; 374/208; 374/141

(58) Field of Classification Search
USPC .................... 374/166, 208, 52, 141
See application file for complete search history.

(56) References Cited

U.S. PATENT DOCUMENTS

| | | | | |
|---|---|---|---|---|
| 4,332,081 | A | * | 6/1982 | Francis .......................... 29/612 |
| 4,955,380 | A | * | 9/1990 | Edell ............................ 600/355 |
| 4,987,579 | A | * | 1/1991 | Yoshinaka et al. .............. 377/25 |
| 5,178,468 | A | * | 1/1993 | Shiokawa et al. ............. 374/185 |
| 6,123,675 | A | * | 9/2000 | Kreizman et al. ............. 600/549 |
| 7,059,769 | B1 | * | 6/2006 | Potega .......................... 374/185 |
| 2004/0215098 | A1 | * | 10/2004 | Barton et al. ................ 600/549 |
| 2005/0226308 | A1 | * | 10/2005 | Hudson ......................... 374/152 |
| 2006/0056487 | A1 | * | 3/2006 | Kuroda et al. ................ 374/179 |
| 2006/0208848 | A1 | * | 9/2006 | Kawamoto et al. ......... 338/22 R |
| 2006/0209920 | A1 | * | 9/2006 | Kamiyama et al. ............. 374/29 |
| 2007/0206655 | A1 | * | 9/2007 | Haslett et al. ................. 374/141 |
| 2008/0056331 | A1 | * | 3/2008 | Matias et al. ................. 374/185 |
| 2010/0202490 | A1 | * | 8/2010 | Ishikawa et al. .............. 374/165 |

FOREIGN PATENT DOCUMENTS

| | | |
|---|---|---|
| JP | 5677731 A | 6/1981 |
| JP | 0520359 U | 3/1993 |
| JP | 0640829 U | 5/1994 |
| JP | 07-057721 | 3/1995 |
| JP | 08-128901 | 5/1996 |
| JP | 11178202 | 7/1999 |
| JP | 2001-185239 | 7/2001 |
| JP | 2003051664 A | 2/2003 |
| JP | 2005-098846 A | 4/2005 |

OTHER PUBLICATIONS

Japanese Office Action mailed on Jan. 22, 2013 for corresponding Japanese Application No. 2009-021120.
Japanese Office Action mailed on Jan. 22, 2013 for corresponding Japanese Application No. 2009-028412.

* cited by examiner

*Primary Examiner* — Mirellys Jagan
(74) *Attorney, Agent, or Firm* — Edwards Wildman Palmer LLP

(57) ABSTRACT

Flexible circuits 2, 3 are formed on a flexible insulating sheet 1. A thermal sensor 4 is connected between the circuits 2, 3. The thermal sensor 4 and connecting parts 5 are integrally covered with an elastic insulating resin 6. While the insulating sheet 1 is bent together with the insulating resin 6, the thermal sensor 4 is pushed onto an object to be sensed 8 via the insulating sheet 1. A plurality of thermal sensors 4 are connected in series in a longitudinal direction of the insulating sheet 1. The insulating resin 6 covers the thermal sensors 4 and the connecting parts 5.

8 Claims, 7 Drawing Sheets

THERMAL SENSING STRUCTURE AND INSULATING STRUCTURE OF THERMAL SENSING CIRCUIT

CROSS REFERENCE TO RELATED APPLICATIONS

This application is on the basis of Japanese Patent Application No. 2009-021120 and No. 2009-028412, the contents of which are hereby incorporated by reference.

BACKGROUND OF THE INVENTION

1. Field of the Invention

The present invention relates to a thermal sensing structure for sensing temperature of, for example, a battery of an electric vehicle, and relates to an insulating structure of a thermal sensing circuit for sensing temperature of, for example, a battery of an electric vehicle.

2. Description of the Related Art

FIG. 6 shows an embodiment of a conventional thermal sensing structure (See Patent Document 1).

In this structure, a circuit board 42 is arranged in an insulating synthetic resin made case 41. A thermal sensor 43 such as a thermistor is connected to the circuit board 42. The thermal sensor 43 is received in a recess 44 at an inside of the case 41. The recess 44 is filled with resin material 45. The thermal sensor 43 is brought into contact with a battery 47 via the resin material 45 and an upper wall 46 of the case 41 to sense the temperature of the battery 47. In this embodiment, the battery 47 is set in the case 41 for charge.

FIG. 7 shows another embodiment of the conventional thermal sensing structure (See Patent Document 2).

In this structure, a thermal sensor 52 is connected to two lead wires 51. Each lead wire 51 is covered with a protective tube 53. The thermal sensor 52 and connecting parts 54 of the lead wires 51 are covered with an insulating resin 55 such as an epoxy resin. The insulating resin 55 is sandwiched by the batteries 56 at the left and right sides. The thermal sensor 52 senses the temperature of the batteries 56.

In Patent Document 2, a flat circuit structure (not shown) in which two lead wires are covered by two front and rear insulating sheets (films), and a thermal sensor connected to the lead wires is interposed between the two insulating sheets is described.

Further, in Patent Document 3, it is described that a PTC device is connected between two metallic lead boards, and an outside of the PTC device is protected by covering it with an insulating resin (not shown). PTC is an abbreviation of "POSITIVE TEMPERATURE COEFFICIENT". The PTC device is normally a several dozen milliohm resistor. However, owing to an abnormal energization or temperature rise, the PTC device becomes several dozen ohm resistor in a short time, and returns to an original resistor when an outside environment returns to a normal condition. The PTC device is used as a thermal sensor.

FIG. 14 shows an embodiment of a conventional insulating structure of a thermal sensing circuit (See Patent Document 2).

In this structure, a thermal sensor 132 such as a thermistor is connected to tip ends of two metallic lead wires 131 with solder. Two insulating films 133 sandwich the lead wires 131 and the thermal sensor 132 to isolate them from an outside. The thermal sensing circuit 134 is composed of the lead wires 131, the thermal sensor 132, and the insulating films 133.

As the temperature increases, the resistivity of the thermistor decreases. When a plurality of thermal sensors are arranged in the thermal sensing circuit 134, two wide insulating films sandwich pairs of lead wires 131 and the thermal sensors 132 connected to respective pairs of lead wires 131. It is widely known that the PTC device can be used instead of the thermistor.

FIG. 15 shows an embodiment of an insulating structure of the PTC device (See Patent Document 3).

In this structure, the PTC device 143 is connected to two metallic lead plates 141 via thin metallic plates 142. The PTC device is covered with insulating resin 144. As the temperature increases, the resistivity of the PCT device 143 increases. The PTC device 143 in this embodiment is not used as a thermal sensor, but a fail-safe device in which the lead plates 141 are connected to respective batteries of a high voltage battery for the electric vehicle.

[Patent Document 1] Japanese Published Patent Application No. 2001-185239 (FIGS. 1 to 3)

[Patent Document 2] Japanese Published Patent Application No. H08-128901 (FIGS. 1 and 7)

[Patent Document 3] Japanese Published Patent Application No. H07-57721 (FIG. 1)

However, in the conventional thermal sensing structure, when a hard circuit board 42 is used, the structure becomes large and expensive. Further, when using the lead wires 51 (including a case that the lead wires are interposed between two insulating sheet), it is hard to connect a plurality of thermal sensors 52, and if possible, many man-hours are needed, and the structure becomes expensive. Further, flexibility is reduced due to two insulating sheets so that the thermal sensor interposed between the insulating sheets may not be in press-contact with a battery. Further, by bending the insulating sheets forcedly, the insulating sheets and the lead wires (circuit) may receive great stress.

Further, in the conventional insulating structure of the thermal sensing circuit shown in FIG. 14, because the lead wires 131 and the thermal sensor 132 are sandwiched by two insulating films 133, the flexibility of the circuit 134 is reduced, and it may be hard to arrange the circuit along a curved surface of the high voltage battery, and to arrange the circuit along each battery disposed in a step shape.

Further, when a plurality of thermal sensors 132 is connected in series to two lead wires 131, soldering operation to connect the thermal sensor 132 to the lead wires 131 separated from the insulating films 133 may be difficult. Further, because wide insulating films 133 are used, the insulating structure becomes expensive.

Accordingly, an object of the present invention is to provide a thermal sensing structure which is compact, allowed to be assembled to a battery (an object to be sensed) side, allowed to arrange a plurality of thermal sensors at low cost, and allows a thermal sensor to be surely in press-contact with a battery (an object to be sensed) without providing great stress to insulating sheets and a circuit.

Another object of the present invention is to provide an insulating structure of a thermal sensing circuit having good flexibility to be easily adapted to an arrangement or a shape of an object to be sensed, being at low cost, and able to improve insulating reliability of a thermal sensing part.

SUMMARY OF THE INVENTION

In order to attain the object, according to the present invention, there is provided a thermal sensing structure including:

a flexible insulating sheet;

a flexible circuit arranged in the flexible sheet;

a thermal sensor connected to connection parts of the circuit in the middle of the circuit;

an elastic insulating resin covering integrally the thermal sensor and the connection parts.

According to the above, when the insulating sheet is bent, the insulating resin is elastically bent to allow the insulating sheet and the circuit to be bent smoothly. Thus, stress affected to the insulating sheet and the circuit is reduced. When the thermal sensor is in press-contact with the object to be sensed via the insulating sheet while both the insulating sheet and the insulating resin are bent, elastic restoring force of the insulating resin maintains the contact surface of the insulating sheet with the object to be sensed flat. Thus, the contact area with the object to be sensed is increased, and the thermal sensing accuracy is increased.

Preferably, the thermal sensor is in press-contact with the object to be sensed via the insulating sheet, while both the insulating sheet and the insulating resin are bent.

According to the above, when the thermal sensor is in press-contact with the object to be sensed via the insulating sheet while both the insulating sheet and the insulating resin are bent, the same effect as described above occurs.

Preferably, a plurality of thermal sensors is arranged in series in a longitudinal direction of the insulating sheet, and the thermal sensors and the connecting parts are covered with the insulating resin.

According to the above, a plurality of thermal sensors are arranged along the long (band-shaped) insulating sheet. The thermal sensors and the connecting parts are covered with the elastic insulating resin. The flat circuit body composed of the long insulating sheet and the thermal sensors is bent flexibly owing to the elastic insulating resin.

According to another aspect of the present invention, there is provided an insulating structure for a thermal sensing circuit including:

a flexible insulating sheet;

a thin-foil-shaped circuit formed on the insulating sheet;

a thermal sensor solder-connected to the circuit in a resistless part of the insulating sheet where a solder resist film is removed;

an insulating resin mold covering the thermal sensor and a solder-connecting part where the sensor is solder-connected to the circuit in the resistless part.

According to the above, the insulating resin mold is firmly fixed to a bare surface of the insulating sheet in the resistless part. Thus, the thermal sensor and the solder-connecting part are surely protected and isolated from outer moisture and the like. The insulating resin mold is made by potting or the like, and isolation of the thermal sensors on the circuit becomes easier with the insulating resin mold and the resistless part. The insulating sheet is bendable together with the solder-resist film and the circuit.

Preferably, the insulating resin mold is smaller than the resistless part.

According to the above, a step is formed between the bare surface of the insulating sheet in the resistless part and the solder-resist film on the insulating sheet. The insulating resin fluid flow is stopped at the step, and a further expansion is prevented. Thus, the isolating resin mold covers the three-dimensional thermal sensor without an exposure.

Preferably, the insulating resin mold and its neighbor are covered with a printed insulating film.

According to the above, in the resistless part, the remaining part (mainly solder-connecting part) of the circuit which is not covered with the insulating resin mold is secondly covered with the printed insulating film. The printed insulating film is formed simultaneously with respect to a plurality of thermal sensors. The printed insulating film is firmly fixed to the bare surface of the insulating sheet in the resistless part.

Further, because the insulating resin mold fluid is covered with the printed insulating film, the further expansion of the insulating resin mold fluid is prevented.

Preferably, the printed insulating film is larger than the resistless part.

According to the above, the insulating resin mold and the exposed circuit part (solder-connecting part) in the resistless part are surely covered with the printed insulating film. An outer periphery of the printed insulating film is attached firmly to the solder-resist film which is outside of the resistless part.

These and other objects, features, and advantages of the present invention will become more apparent upon reading of the following detailed description along with the accompanied drawings.

DETAILED DESCRIPTION OF THE PREFERRED EMBODIMENTS

Figure 1A:
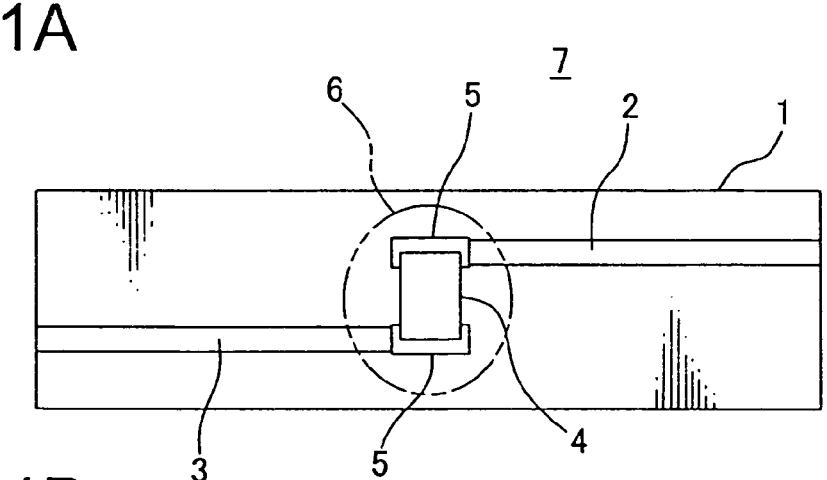
FIG. 1A is a plan view showing an embodiment of a thermal sensing structure according to the present invention.
Figure 1B:
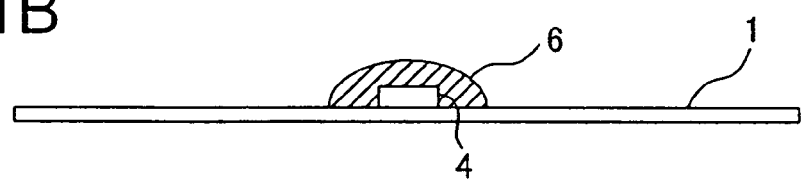
FIG. 1B is a front view showing an embodiment of a thermal sensing structure according to the present invention.
Figure 2:
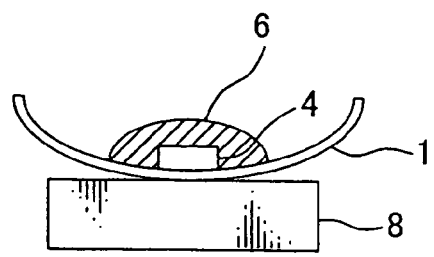
FIG. 2 is a front view showing the thermal sensing structure pressed onto an object to be sensed.

FIGS. 1A to 2 show an embodiment of a thermal sensing structure according to the present invention.

As shown in FIG. 1A, this thermal sensing structure is characterized by that two thin-foil-shaped metallic flexible circuits 2, 3 are formed on a surface (upper wall) of a flexible insulating sheet 1, a thermal sensor 4 is connected to two circuits 2, 3 (two circuits 2, 3 are connected to each other with the thermal sensor 4), and as shown in FIG. 1B, the thermal sensor 4 and connecting parts 5 are covered with an elastic insulating resin 6 by potting.

Preferably, the circuits 2, 3 are formed on the insulating sheet 1 by printing. Preferably, the circuits 2, 3 on the insulating sheet 1 are covered with an insulating film except the thermal sensor 4 and its neighbor (potting part 6). It is possible that the circuits 2, 3 are covered with an upper insulating sheet (preferably as thin as possible, because of flexibility) similar to the insulating sheet 1 instead of this insulating film (not shown), and a hole is formed on the upper insulating sheet to expose the thermal sensor 4 and its neighbor, and then potting is performed.

The insulating sheet 1 is formed in a horizontally long band shape (in FIG. 1A, a part of the insulating sheet 1 in a longitudinal direction is shown). Two circuits 2, 3 are separated from each other in a width direction of the insulating sheet in a range of a length of the thermal sensor 4, and separated into front and rear sides of the insulating sheet 1 and parallel to each other.

The thermal sensor 4 is formed in a rectangular shape, and has terminals at respective ends in a longitudinal direction. One terminal is connected and fixed to the circuit 2 with solder, and the other terminal is connected and fixed to the circuit 3 with solder (reference number 5 indicates a solder connecting part).

When one terminal of the thermal sensor 4 is an anode and the other terminal is a cathode, a plurality of thermal sensors 4 is arranged with intervals in a longitudinal direction of the insulating sheet 1. The circuits 2, 3 back and forth are extended in the longitudinal direction of the insulating sheet 1, and bent in a crank shape. A bended part (not shown) of the one circuit 2 is connected with solder to a cathode of the right-side thermal sensor (not shown). A bended part (not shown) of the other circuit 3 is connected with solder to an anode of the left-side thermal sensor (not shown). Thus, the thermal sensors are connected in series.

A flexible flat circuit body is composed of the insulating sheet 1, the circuit 2, 3 and an insulating cover film on the circuits (not shown). A flat circuit body 7 having a thermal sensor is composed of the insulating sheet 1, the circuit 2, 3, the thermal sensor 4, the insulating cover film (not shown) and the insulating resin 6.

The thermal sensors 4 are arranged at equal intervals corresponding to the batteries (objects to be sensed in FIG. 2) of an assembled battery of an electric vehicle including a hybrid car. The circuits 2, 3 are connected to a controller (not shown) via metallic terminals (not shown) at both front and back ends of the insulating sheet 1 in the longitudinal direction. The controller is connected to such as a temperature alert display (not shown).

When used in a battery other than a battery for an electric vehicle, the flat circuit body 7 having a thermal sensor shown in FIG. 1 can be used as-is. In this case also, the ends of the circuits 2, 3 are connected to the controller or the like (not shown) via the metallic terminals or the like (not shown) at both front and back ends of the insulating sheet 1.

A potting process is to drop the liquid (viscous) insulating resin 6 on the thermal sensor 4 by a nozzle, a dispenser, or a hand and to form the insulating resin 6 in a dome shape. The potting process is well-known. The insulating resin 6 is formed in a circular or an oval shape in a plan view. In case of the oval shape, for example, while the nozzle is moved in a width direction of the insulating sheet 1, the liquid insulating resin 6 is dropped. It is also possible that the liquid insulating resin 6 is poured into a dome-shaped metallic mold closely attached to the insulating sheet 1 as the potting process.

An elastomer material or a rubber material which is flexible at room temperature such as urethane or epoxy is used as the insulating resin 6. The insulating resin 6 protects and insulates the thermal sensor 4 and the connecting parts 5 from an outside. The circuits 2, 3 are protected by the insulating film. A color of the insulating resin 6 is selectable such as transparent or colored.

Figure 3A:
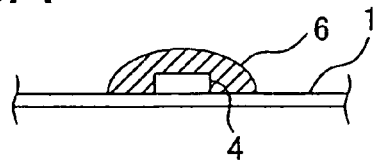
FIG. 3A is a front view showing an initial state of the thermal sensing structure.
Figure 3B:
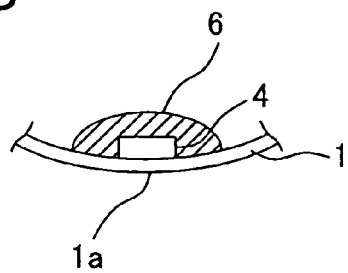
FIG. 3B is a front view showing the thermal sensing structure in use.

As shown in FIG. 1B and FIG. 3A, the thermal sensor 4 and the insulating resin 6 are provided on the insulating sheet 1. As shown in FIG. 2 and FIG. 3B, the insulating sheet 1 is curved upward in a thickness direction around the thermal sensor 4, so that the thermal sensor 4 is pressed to contact the battery (object to be sensed) 8 via the insulating sheet 1. The thermal sensor 4 is firmly (with a proper pressure) pushed to the battery 8 with a curving forth (compression forth) of the insulating sheet 1.

Because the insulating resin 6 is flexible, the insulating sheet 1 is smoothly curved around the thermal sensor 4. The insulating resin 6 is deformed together with the insulating sheet 1 to allow the insulating sheet 1 to be curved smoothly. Thereby, a large stress is not applied to the insulating sheet 1, the circuits 2, 3, and the connecting parts 5, so that the insulating sheet 1 and the circuits 2, 3 are prevented from being folded, and the connecting parts 5 is prevented from being cracked.

Figure 4:
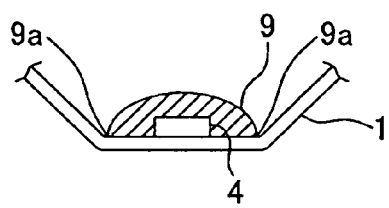
FIG. 4 is a front view showing a problem when a non-elastic resin is used corresponding to FIG. 3B.

As shown in FIG. 4, when a non-elastic insulating resin 9 is used, the insulating sheet 1 is folded in a V-shape around an outer edge 9a of the insulating resin 9 together with the circuits 2, 3. Thus, a large stress is applied to the insulating sheet 1, the circuits 2, 3, and the connecting parts 5. This problem is solved by using the elastic insulating resin 6.

Further, as shown in FIG. 3B, when the insulating sheet 1 is curved in a small radius, an elastic force of the insulating resin 6 acts to make the curving end 1a of the insulating sheet 1 flat. Therefore, the curving end 1a makes not point-contact or line-contact but surface-contact with the battery 8 (FIG. 2). Therefore, the temperature of the battery 8 is rapidly and surely transmitted to the thermal sensor 4 via the insulating sheet 1, and the accuracy of the sensing is increased.

Figure 5:
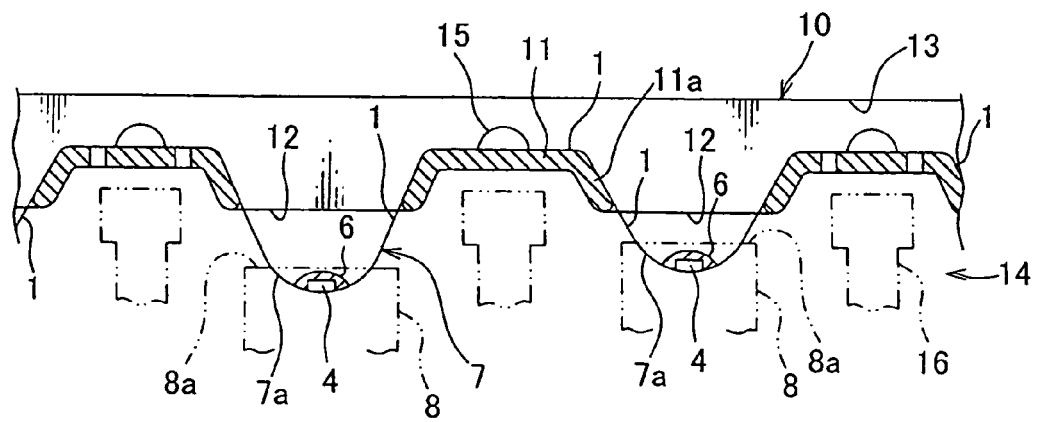
FIG. 5 is a vertical sectional view showing an application example of the thermal sensing structure.
Figure 6:
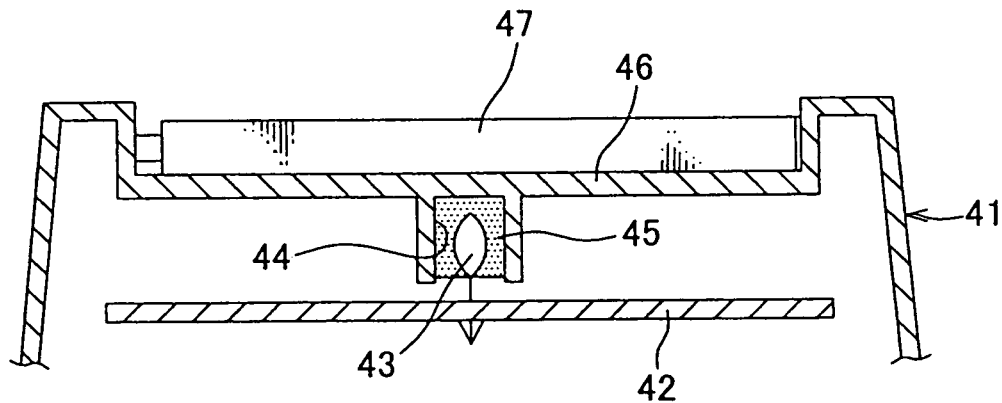
FIG. 6 is a vertical sectional view showing an embodiment of a conventional thermal sensing structure.
Figure 7:
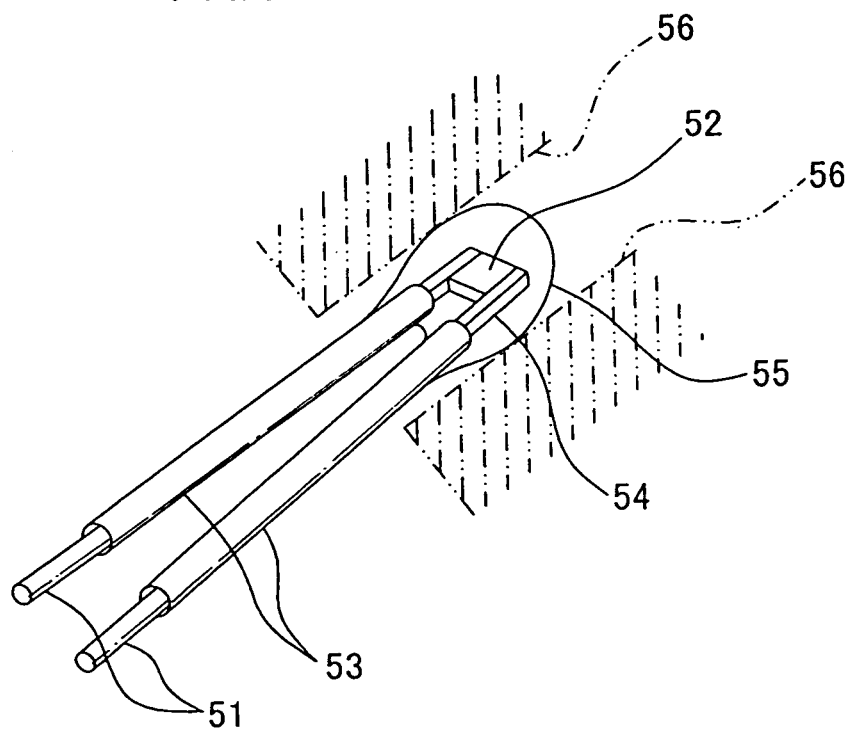
FIG. 7 is a perspective view showing another embodiment of the conventional thermal sensing structure.

FIG. 5 shows an example of an application of the thermal sensing structure described above.

A flexible flat circuit 7 includes a plurality of thermal sensors 4 connected in series in an even pitch in a longitudinal direction of the band-shaped insulating sheet 1. The flat circuit 7 is curved in substantially a wave shape, and received in a case 10 made of insulating resin. Each projecting part 7a in the wave shape is guided out from each rectangular opening 12 in a bottom wall 11 of the case 10. The thermal sensor 4 and the potted insulating resin 6 are provided on an inner wall of a tip end of each projecting part 7a.

Due to the flexibility of the insulating resin 6, the tip end of the projecting part 7a is smoothly curved in an arc shape. In this condition, the tip end of the projecting part 7a is pushed against the battery 8 of a battery unit 14 of an electric vehicle (including a hybrid vehicle), and the thermal sensor 4 disposed at an inside of the tip end of the projecting part 7a senses the temperature of the battery 8.

In FIG. 5, an initial condition of the projecting part 7a of the flat circuit 7 where the battery 8 is not provided is shown. In reality, the projecting part 7a elastically abuts on an upper end wall 8a of the battery 8. The projecting part 7a is pressed upward and deformed, and the elastic restoring force pushes the tip end of the projecting part 7a, namely, the thermal sensor 4 onto the upper end wall 8a of the battery 8 via the insulating sheet 1.

The case 10 is surrounded by the walls 11, 13 on left and right sides and a bottom side, and is in a tub shape. An opening 12 of the bottom wall 11 is extended to a slope wall 11a. An upper projection 15 of the bottom wall 11 penetrates a small hole (not shown) of the insulating sheet 1, and fixes the insulating sheet 1 by thermal caulking. Various ways can be properly adopted regarding a fixing way of the insulating sheet 1 and a shape of the case 10. In FIG. 5, reference numeral 16 indicates an insulating separating wall for separating the batteries 8 of the battery unit 14 from each other.

Incidentally, in this embodiment, the thermal sensor 4 is disposed on the curving part or the projecting part 7a of the insulating sheet 1. However, the insulating sheet 1 can be curved two-dimensionally or tree-dimensionally along a curved object to be sensed (not shown), and the thermal sensor 4 can sense the temperature of the object. In this case, also, the potted insulating resin 6 is elastically bent and smoothly curved together with the insulating sheet 1 with a little stress.

Further, the present invention can be used not only as the thermal sensing structure, but also as a method for sensing the temperature, or a flat circuit having a thermal sensor.

FIGS. 8A to 10 show an embodiment of an insulating structure of a thermal sensing circuit according to another aspect of the present invention in a production process sequence.

Figure 8A:
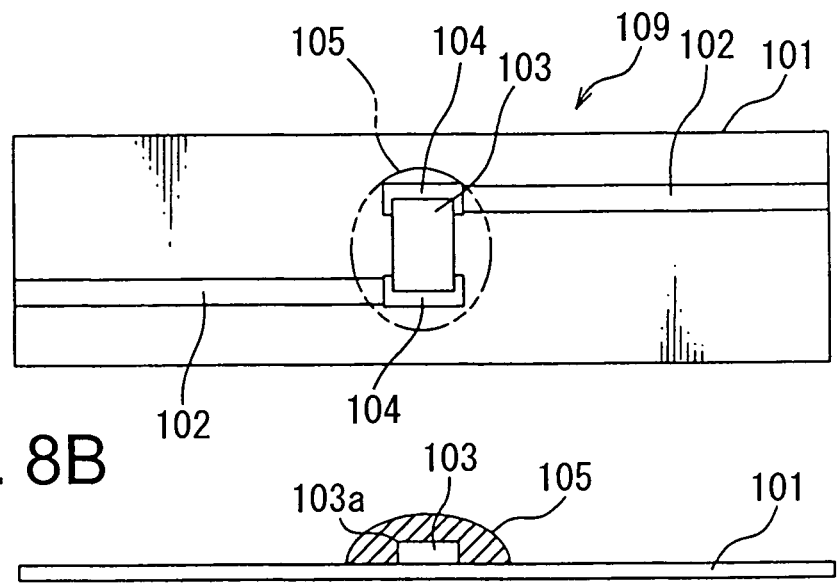
FIG. 8A is a plan view showing a primary insulating state of an embodiment of an insulating structure of a thermal sensing circuit according to another aspect of the present invention.
Figure 8B:
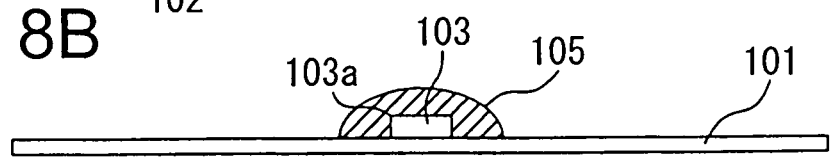
FIG. 8B is a front view showing the primary insulating state of FIG. 8A.

As shown in FIGS. 8A and 8B, two circuits 102 are parallel to each other and separated in a width direction of a rectangular flexible insulating sheet 101 and separated in a longitudinal direction of the insulating sheet 101. Both ends of a rectangular thermal sensor 103 are respectively connected to opposed tip ends of the circuits 102 with a solder (solder connecting part is indicated by reference numeral 104). An insulating resin mold 105 covers the thermal sensor 103 and the solder connecting part 104 to insulate them.

Preferably, the circuits 102 are formed on the insulating sheet 101 by printing. It is also possible to fix a copper foil on the insulating sheet 101 by adhesive bonding. In both ways, the circuits 102 are bendable in a thickness direction together with the insulating sheet 101. Preferably, the thermal sensor 103 is a PTC device.

The insulating resin mold 105 is formed by, for example, potting. For example, a liquid insulating resin material is discharged toward the thermal sensor 103 from an upper nozzle (not shown). For another example, while an injection mold is set on the thermal sensor 103 on the insulating sheet 101, the insulating resin material is poured into the injection mold to form the insulating resin mold in a circular or an oval shape surrounding the thermal sensor 103. A material which is flexible at normal temperature and bendable together with the insulating sheet 101 and the circuits 102 such as epoxy or urethane is preferable as the insulating resin. The insulating resin mold 105 insulates and protects the thermal sensor 103 and the solder connecting part 104 from an outside.

Figure 9:
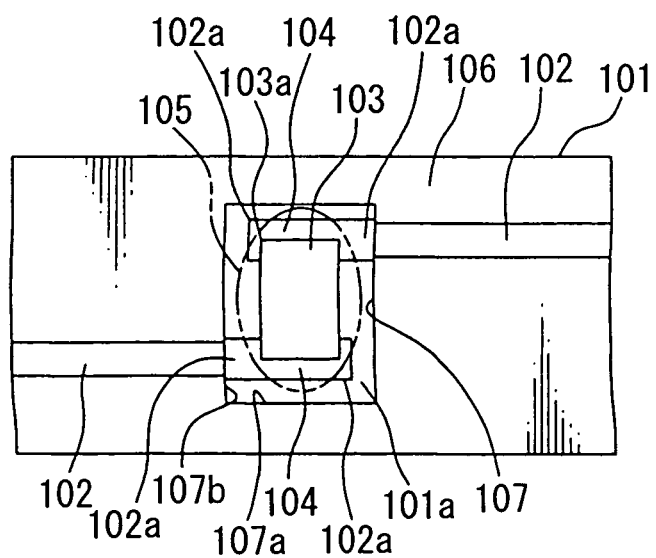
FIG. 9 is a partially sectional plan view showing a main part of the insulating structure of the thermal sensing circuit.

As shown in FIG. 9 (a partially enlarged view of FIG. 8A), a solder resist layer 106 for covering the thermal sensor 103 and the circuits 102 on the insulating sheet 101 is previously partially removed in a rectangular shape. (When covering the circuits 102 on the insulating sheet 101 with the solder resist layer 106 at the circuit producing process, the solder resist layer 106 is not formed around the thermal sensor 103.) The solder resist layer 106 prevents the solder from adhering other than end parts 104 of the circuits 102.

A resist removed part 107 is larger than the insulating resin mold 105 shown in FIG. 8A. A bare surface 101a of the insulating sheet 101 is exposed in the rectangular resist removed part 107.

A diameter of the dome-shaped insulating resin mold 105 integrally covering the box-shaped thermal sensor 103 and the solder connecting part 104 is previously set. Sizes (length 107a and width 107b) of the resist removed part 107 are set larger than the diameter of the insulating resin mold 105. Preferably, sizes of the resist removed part 107 in a longitudinal direction and a width direction of the insulating sheet 101 is equal to or a little larger than those of the insulating resin mold 105.

The insulating resin mold 105 is formed in an inside of the resist removed part 107. When the insulating resin mold 105 is formed on the solder resist layer 106, the insulating resin mold 105 is easy to be removed. When the insulating resin mold 105 is directly formed on the bare surface 101a of the insulating sheet 101 in the resist removed part 107, the insulating resin mold 105 adheres and is fixed to the bare surface 101a of the insulating sheet 101. Thus, the insulating resin mold 105 is prevented from spreading, and the box-shaped thermal sensor 103, in particular, an upper corner 103a (FIG. 8B) is surely covered without any exposure by the insulating resin mold 105.

Further, a step (indicated by the reference numeral 107 in FIG. 9) having a thickness of the solder resist layer 106 is formed between the surface of the solder resist layer 106 and the bare surface 101a of the insulating sheet 101 due to the resist removed part 107. This step prevents the insulating resin mold 105 from spreading, and similarly, the box-shaped thermal sensor 103 is surely covered without any exposure by the insulating resin mold 105.

Figure 10:
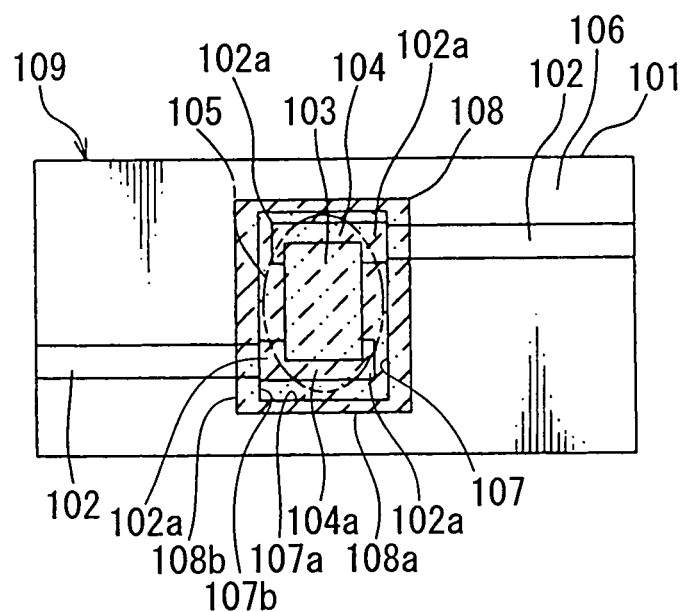
FIG. 10 is a plan view showing a secondary insulating state (finished state) of the insulating structure of the thermal sensing circuit.

As shown in FIG. 9, an uncovered circuit part 102a (mainly a part of the solder connecting part 104) is not covered with the insulating resin mold 105 in the resist removed part 107. As shown in FIG. 10, a printed insulating film 108 formed by silk screen printing covers the uncovered circuit part 102a and the insulating resin mold 105. Thus, the uncovered circuit part 102a is completely insulated from an outside, and the thermal sensor 103 and the solder connecting part 104 are doubly insulated by the insulating resin mold 105 and the printed insulating film 108.

The printed insulating film 108 is formed larger than the resist removed part 107. A length 108a and a width 108b of the printed insulating film 108 are larger than those 107a, 107b of the resist removed part 107. Thus, the insulating resin mold 105 and the uncovered circuit part 102a are completely covered by the printed insulating film 108.

Thereby, an insulating performance of the solder connecting part 104 is increased. Further, because the insulating resin mold 105 is covered with the printed insulating film 108 while the insulating resin mold 105 still has liquidity, the insulating resin mold 105 is prevented from spreading.

Figure 11:
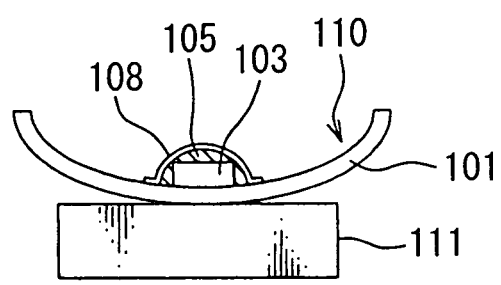
FIG. 11 is a partially sectional plan view showing a usage example of the thermal sensing circuit.

As shown in FIG. 10, a circuit main body 109 is composed of the insulating sheet 101, the insulating solder resist layer 106, and the circuits 102. As shown in FIG. 11, a flat temperature sensing circuit 110 is composed of the circuit main body 109, the insulating resin mold 105, and the printed insulating film 108.

Incidentally, in FIG. 9, the connecting parts 105 may cover the whole resist removed part 107. In this case, the dome-shaped insulating resin mold 105 becomes larger.

Further, the resist removed part 107 may be formed in not a rectangular shape, but a circular or an oval shape corresponding to the shape of the insulating resin mold 105. In this case, preferably, the printed insulating film 108 is formed in a circular or an oval shape corresponding to the shape of the resist removed part 107. Preferably, the printed insulating film 108 is formed by screen printing. However, offset printing, anastatic printing, gravure printing or the like can be used.

In FIG. 11, a temperature of a battery 111 (object to be sensed 111) of such as a high voltage battery unit is sensed by touching the temperature sensing circuit 110. The high voltage battery unit is used in an electric vehicle including a hybrid vehicle.

As shown in FIG. 11, the thermal sensor 103 press-contacts the battery 111 via the insulating sheet 101 while the temperature sensing circuit 110 is bent. An elastic force generated by bending the insulating sheet 101 pushes the thermal sensor 103 onto the battery 111, thereby the temperature of the battery 111 is sensed correctly.

Figure 12:
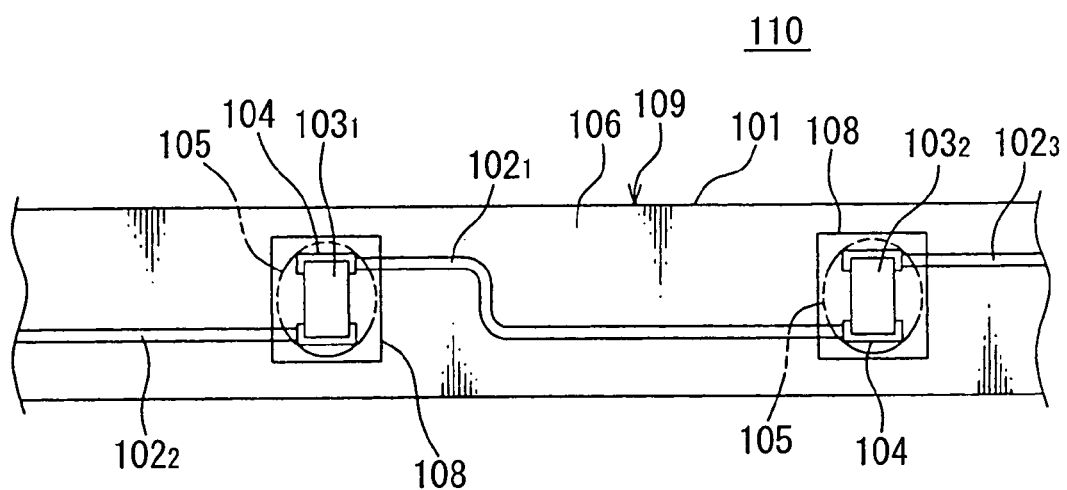
FIG. 12 is a plan view showing a variation example of the thermal sensing circuit.

In this embodiment, only one thermal sensor 103 is used. In reality, as shown in FIGS. 12 and 13, a plurality of thermal sensors is connected in series to the oblong circuit main body 109.

Figure 13:
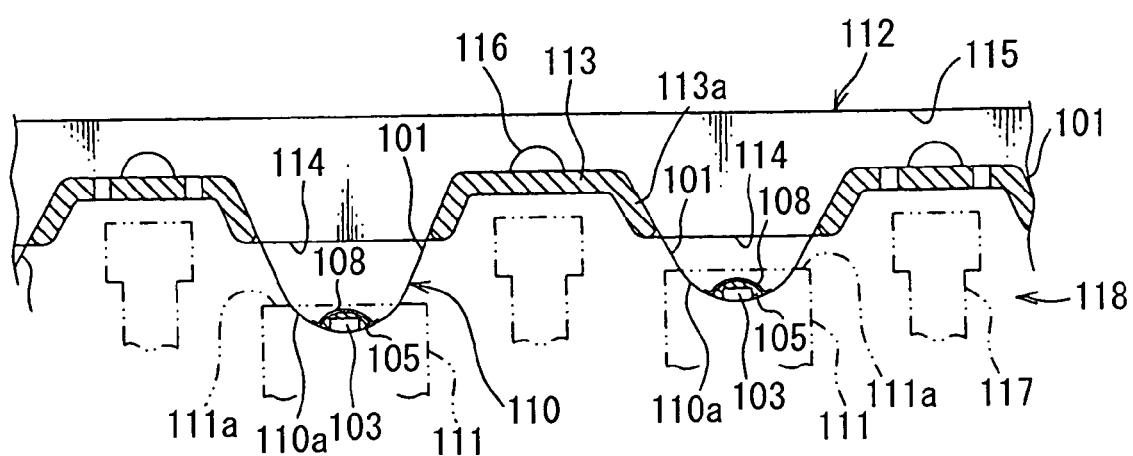
FIG. 13 is a vertical sectional view showing an application example of the thermal sensing circuit.
Figure 14:
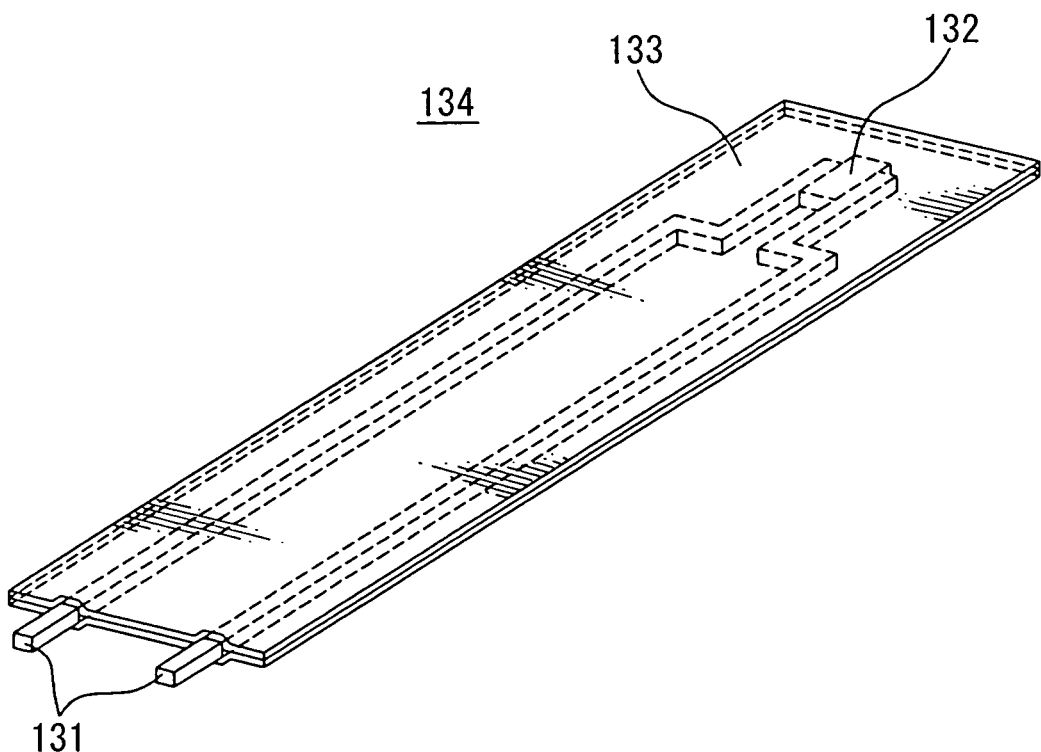
FIG. 14 is a perspective view showing an embodiment of a conventional insulating structure of the thermal sensing circuit.
Figure 15:
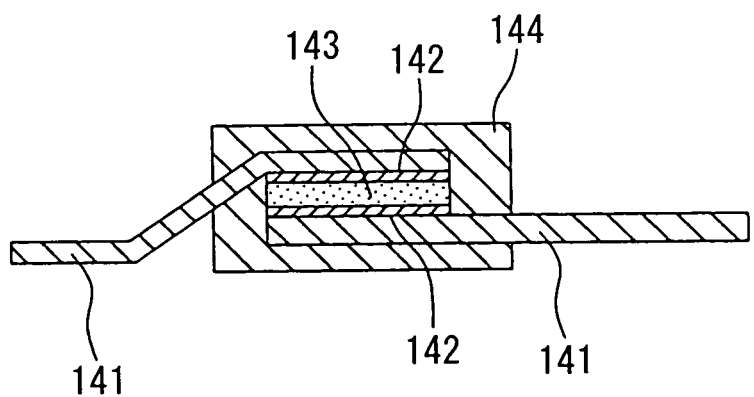
FIG. 15 is a vertical sectional view showing an embodiment of a conventional insulating structure of a PTC device.

As shown in FIG. 13, the circuits 102 are bent in a crank shape on the insulating sheet 101. For example, an end of a first circuit $102_1$ is connected to an anode of a first temperature sensor $103_1$ with solder, the other end of the first circuit $102_1$ is connected to a cathode of a second temperature sensor $103_2$ with solder, an end of a second circuit $102_2$ is connected to a cathode of the first temperature sensor $103_1$ with solder, and an end of a third circuit $102_3$ is connected to an anode of the second temperature sensor $103_2$ with solder. In this way, a plurality of thermal sensor 103 (the number of the thermal sensors 103 corresponds to the number of the batteries 111 of the high voltage battery unit) is connected in series to the circuits 102.

As shown in FIG. 13, the temperature sensing circuit 110 is bent in substantially a wave shape, and received in a case 112 made of insulating resin. Each projection part 110a of the wave-shaped temperature sensing circuit 110 is guided out from each rectangular opening 114 on a bottom wall 113 of the case 112. The thermal sensor 103, the insulating resin mold 105, and the printed insulating film 108 are disposed on an inner wall at a tip end of the projection part 110a.

In FIG. 13, the projection part 110a of the temperature sensing circuit 110 is in an initial state where the batteries 111 do not exist. In reality, a tip end of the projection part 110a contacts an upper wall 111a of the battery 111. The projection part 110a is pushed upward and deformed. Its restoring force elastically pushes the tip end of the projection part 110a, namely, the thermal sensor 103 onto the upper wall 111a of the battery 111 via the insulating sheet 101. The tip end of the projection part 110a may contact the upper wall 111a of the battery 111 in a flat plane, or in a curved plane.

The case 112 is surrounded by the walls 113, 115 on left and right sides and a bottom side, and is in a tub shape. An opening 114 of the bottom wall 113 is extended to an upper slope wall 113a. An upper projection 116 of the bottom wall 113 penetrates a small hole (not shown) of the insulating sheet 101, and fixes the insulating sheet 101 by thermal caulking. Various ways can be properly adopted regarding a fixing way of the insulating sheet 101 and a shape of the case 112. In FIG. 13, reference numeral 117 indicates an insulating separating wall for separating the batteries 111 of the battery unit 118 from each other. At back and forth ends in the longitudinal direction of the insulating sheet 101, each circuit 102 is connected to a controller circuit (not shown) via a terminal (not shown), and the controller circuit is connected to an alarm displaying part (not shown).

Incidentally, in this embodiment, the thermal sensor 103 is disposed on the curving part or the projecting part 110a of the insulating sheet 101. However, the insulating sheet 101 can be curved two-dimensionally or tree-dimensionally along a curved object to be sensed (not shown), and the thermal sensor 103 can sense the temperature of the object.

Further, the another aspect of the present invention can be used not only as the insulating structure of a thermal sensor circuit, but also as an insulating structure of a thermal sensor, a thermal sensor circuit, an insulating method of a thermal sensor circuit, a method for producing an insulating part of a thermal sensor circuit, or a production method of a thermal sensor circuit.

INDUSTRIAL APPLICABILITY

The thermal sensing structure and the insulating structure of a thermal sensor circuit according to the present invention can be used for alarming an abnormal temperature rise by sensing temperature of each battery of a battery unit of an electric vehicle including a hybrid vehicle. The thermal sensing structure and the insulating structure of a thermal sensing circuit can also be used for sensing an abnormal temperature rise of a controller circuit, a relay or the like in an on-vehicle electric junction box.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A thermal sensing structure comprising:
a flexible insulating sheet;
a flexible circuit arranged in the flexible sheet;
a thermal sensor connected to connection parts of the circuit in the middle of the circuit;
an elastic insulating resin covering the thermal sensor without an exposure, and covering the connection parts,
wherein a plurality of the thermal sensors are arranged in series in a longitudinal direction of the insulating sheet, and the flexible insulating sheet is arranged alternately above and below relative to each of the plurality of the thermal sensors respectively.

2. The thermal sensing structure as claimed in claim 1, wherein each of the plurality of the thermal sensors is in press-contact with an object to be sensed via the insulating sheet, while both the insulating sheet and the insulating resin are bent.

3. The thermal sensing structure as claimed in claim 1, wherein the plurality of the thermal sensors and the connecting parts are covered with the insulating resin.

4. The thermal sensing structure as claimed in claim 1, wherein each of the plurality of the thermal sensors press-contacts an object to be sensed via the insulating sheet when the thermal sensor senses a temperature of the object.

5. The thermal sensing structure as claimed in claim 1, wherein the flexible circuit comprising a plurality of the thermal sensors in a longitudinal direction of the insulating sheet made in a band shape is curved in a wave shape and received in a case when the thermal sensors sense a temperature of an object.

6. The thermal sensing structure as claimed in claim 5, wherein a plurality of projecting parts of the flexible circuit are guided out from openings in a bottom wall of the case when the plurality of the thermal sensors sense the temperature of the object.

7. The thermal sensing structure as claimed in claim 5, wherein a plurality of projecting parts of the flexible circuit comprise the plurality of the thermal sensors and the insulating resin at its tip end when the plurality of the thermal sensors sense the temperature of the object.

8. The thermal sensing structure as claimed in claim 7, wherein a plurality of projecting parts of the flexible circuit elastically abuts on the -object to be sensed when the plurality of the thermal sensors sense the temperature of the object.

* * * * *